(No Model.)
W. J. KETNER.
THILL COUPLING.
No. 267,223. Patented Nov. 7, 1882.
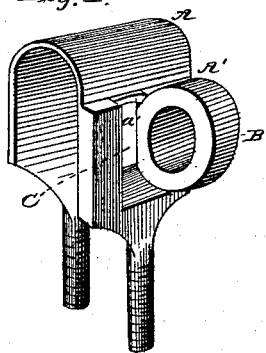
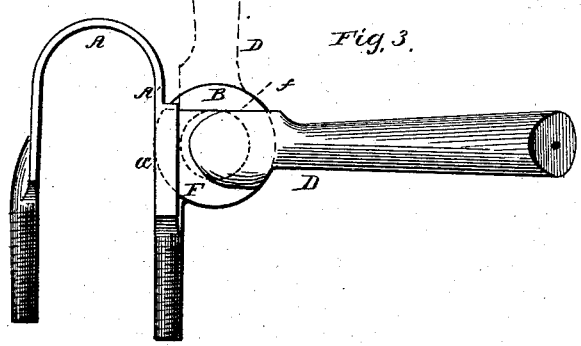
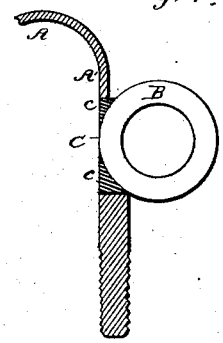
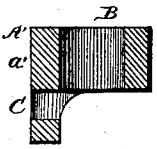
WITNESSES:
Fred. G. Dieterich
Jno. W. Stockett
William J. Ketner
INVENTOR.
by
Louis Bagger & Co.
ATTORNEYS.
N. PETERS. Photo-Lithographer, Washington, D.C.

UNITED STATES PATENT OFFICE.

WILLIAM J. KETNER, OF LANCASTER, WISCONSIN, ASSIGNOR OF ONE-HALF TO REUBEN BLACK, OF SAME PLACE.

THILL-COUPLING.

SPECIFICATION forming part of Letters Patent No. 267,223, dated November 7, 1882.

Application filed August 18, 1882. (No model.)

*To all whom it may concern:*

Be it known that I, WILLIAM J. KETNER, of Lancaster, in the county of Grant and State of Wisconsin, have invented certain new and useful Improvements in Thill-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the clip and box of my improved thill-coupling. Fig. 2 is a similar view of the thill-iron which engages with the box and clip. Fig. 3 is a side view of the complete coupling, the dotted lines showing the position of the thill-iron after its removal from the clipping-box; and Figs. 4 and 5 are sectional detailed views of the complete coupling, taken at right angles to each other.

Similar letters of reference indicate corresponding parts in all the figures.

My invention has relation to thill-couplings, and has for its object to construct a coupling which shall consist of few parts, which may readily be coupled or uncoupled, if desired, and which, therefore, is not liable to break or get out of order.

In the accompanying drawings, the letter A represents the clip, one side, A', of which is cast with a cylindrical sleeve or tubular bearing, B, and is provided with a slot or recess, C, conforming to the curvature of that part of the cylindrical sleeve B which projects into or forms part of the thickened part A' of the clip.

D is the thill-iron, the lower end of which forms a rounded head or segment, which is provided with a concentric circular stud or trunnion, G. This head is cut off flat or straight on one side, as shown at *f*, flush with the base of the trunnion G, which is of such length and diameter as to fit snugly within the circular sleeve B, while the rounded head F is of such a thickness as to form a flange at the base of trunnion G, adapted to enter the curved slot or recess C in the thickened part or body A' of the clip.

From the foregoing description, taken in connection with the drawings, the operation of my improved thill-coupling will be readily understood. When it is desired to couple or uncouple the thill-iron to or from the clip it is held in a vertical position, as shown in the dotted lines, in which position the trunnion G will readily enter its cylindrical box or sleeve B. When the thill is turned down in its normal working position the shoulder of the flange-head F will enter the slot or recess C in the clip, and thus prevent the trunnion G from slipping out of its bearing sidewise.

If desired, a small rubber block or cushion may be placed at the bottom or inner end of the slot or recess C, as shown at *c*, which will operate to force the flange-head F of the thill-iron in an outward direction, so as to prevent rattling of its trunnion G in the sleeve B.

Having thus described my invention, I claim and desire to secure by Letters Patent of the United States—

The combination, in a thill-coupling, of the clip A, having thickened part A', cast with the cylindrical sleeve B, and having the rounded recess C concentric with sleeve B, and thill-iron D, having the rounded flange-head F, trunnion G concentric with said head, and shoulder *f*, constructed and combined to operate substantially in the manner and for the purpose herein shown and described.

In testimony that I claim the foregoing as my own I have hereunto affixed my signature in presence of two witnesses.

WILLIAM J. KETNER.

Witnesses:
JOHN F. LANE,
H. BUCHNER.